Figure 1:
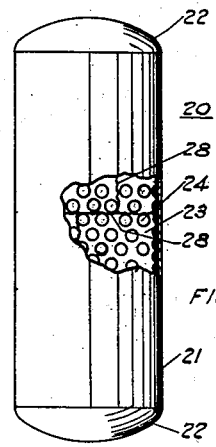

Nov. 30, 1937.   H. R. AUSTIN   2,100,895
LINING FOR VESSELS
Filed Oct. 9, 1935   2 Sheets-Sheet 1

INVENTOR
Harold R. Austin
BY Virgil F. Davis
ATTORNEY

Nov. 30, 1937.   H. R. AUSTIN   2,100,895
LINING FOR VESSELS
Filed Oct. 9, 1935   2 Sheets-Sheet 2

INVENTOR
Harold R. Austin
BY
Virgil F. Davis
ATTORNEY

Patented Nov. 30, 1937

2,100,895

UNITED STATES PATENT OFFICE 2,100,895

LINING FOR VESSELS

Harold R. Austin, South Norwalk, Conn., assignor to The M. W. Kellogg Co., New York, N. Y., a corporation of Delaware Application October 9, 1935, Serial No. 44,136

5 Claims. (Cl. 196—133)

This invention relates in general to lining the interior of vessels and more specifically to the lining of the interior of vessels with corrosion resistant material.

In the chemical and petroleum refinery arts it is not unusual to carry out in steel vessels reactions at temperatures of 1000° F., or more, under pressures of 1000 pounds per square inch, or more, with materials that are highly corrosive at the reaction temperatures mentioned. Under the reaction conditions mentioned deterioration of the vessels is very rapid and their safe useful life is comparatively short. In the pressure cracking of petroleum fractions, which is always carried out at elevated temperatures, corrosive compounds are encountered or are developed in the decomposition process which attack the steel walls of the vessels and cause rapid deterioration or corroding away of the metal.

In practice the shells of vessels of this class are fabricated of much heavier material than is necessary merely to withstand the temperature and pressures ordinarily employed, for the reason that in the course of operation the interior surfaces of the walls are deteriorated to such an extent that their strength is materially impaired. Accordingly it has been necessary to allow for a certain amount of deterioration by making the walls of extra thickness. It will be seen that the expense of constructing large vessels is multiplied rapidly as the thickness of the shells is increased. It is therefore of advantage to provide an effective lining which is adapted to protect the interior surface of a vessel and which makes it unnecessary to provide a corrosion allowance.

Two types of metallic or alloy metal linings have come into use. The first type usually includes a plurality of overlapping shaped plates that cover all, or only a portion, of the inner surface of the walls of the vessels and are so supported that they are unrestrained and may freely expand and contract with temperature changes. This type has some advantages but is not generally favored as it does not provide an impervious shield for the vessel walls. The second type usually includes a lining that completely covers the inner surface of the vessel walls and is bonded thereto. This type while it is more generally favored also has serious disadvantages which mainly arise from the fact that since the linings are bonded to the vessel walls they are restrained and cannot freely expand and contract with temperature changes. As a result of this restraint the linings eventually crack and/or pull away from the welds, or other bonding means.

Various expedients have been proposed for eliminating the causes of failure of the linings but none has proved a complete solution of the problem. The proposed expedients generally attempt to overcome the restraint imposed by the bonding welds, or their equivalents, but while they sometimes provide for expansion and contraction in one direction, i. e., either longitudinally or circumferentially of the lining, they do not provide for expansion and contraction, or for the dissipation of the stresses due to expansion and contraction, in all directions.

It is an object of this invention to provide a corrosion resistant lining of simple construction, for vessels of the character mentioned, which is of such a nature that although bonded to the vessel walls, substantial portions of its surface are free to expand and contract in all directions whereby destructive stresses are not set up in the lining during use.

It is a further object of this invention to provide a corrosion resistant lining, for vessels of the character mentioned, of simple construction which includes spaced convex, or concave, areas so arranged over the surface of the lining that the stresses set up in the lining during use are dissipated by the breathing of the spaced convex, or concave areas.

It is also an object of this invention to provide a vessel of the character described that is protected against corrosion by a thin lining made of high corrosion resistant material, the lining including spaced concave or convex areas to provide for the dissipation of the stresses set up in the lining during use of the vessel and the portions of the lining that extend from the vessel walls being protected against collapse by metal pads that are interposed between the lining and said portions.

Figure 3:
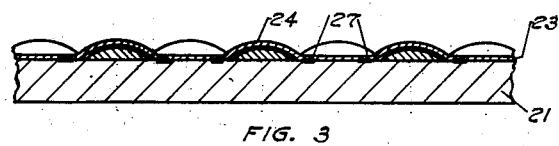
Figure 2:
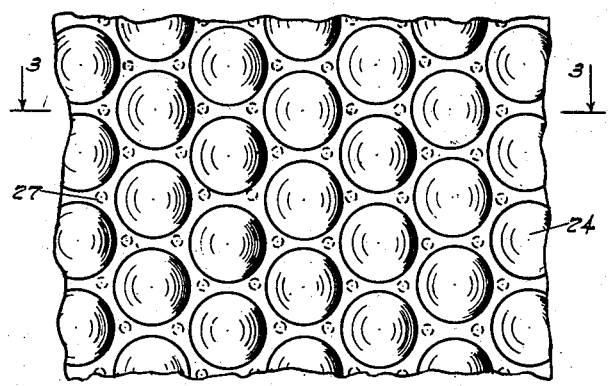
Figure 5:
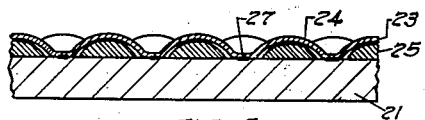
Figure 7:
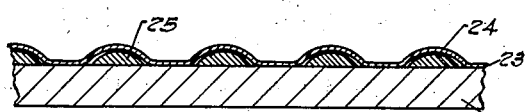
Figure 4:
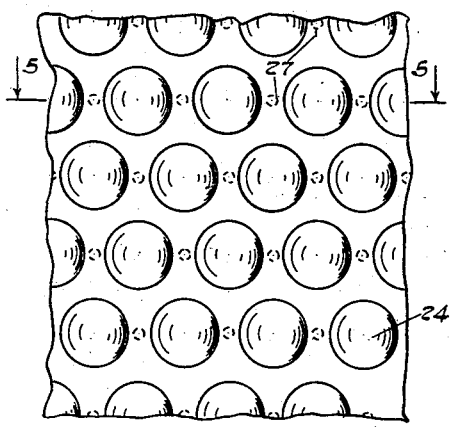
Figure 6:
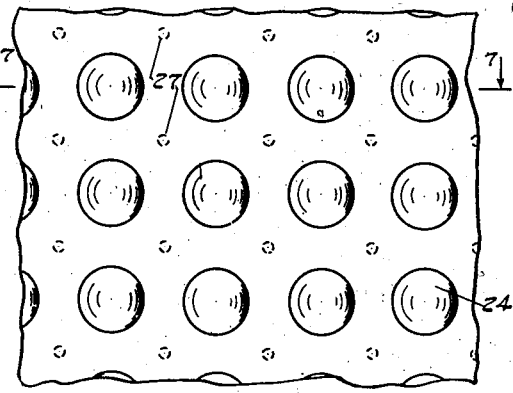
Figure 9:
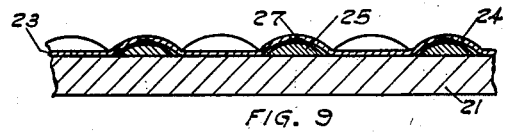
Figure 11:
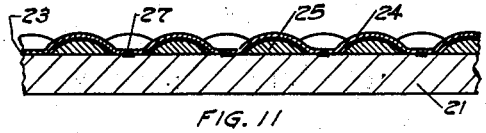
Figure 8:
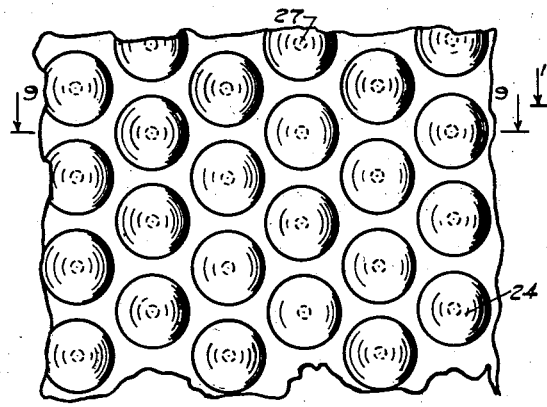
Figure 10:
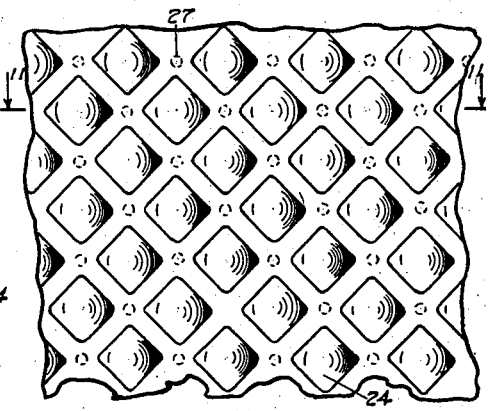
Figure 13:
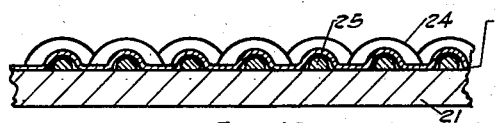
Figure 15:
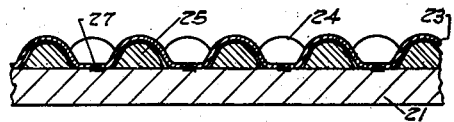
Figure 12:
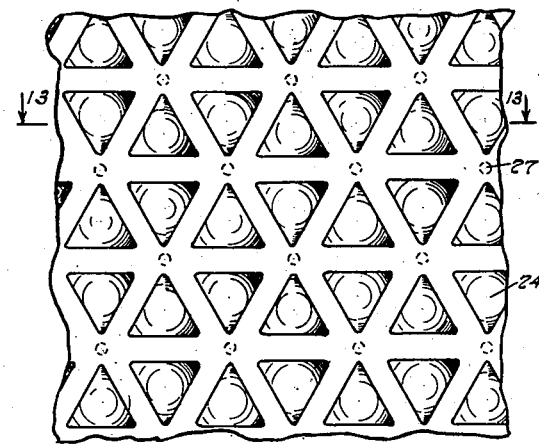
Figure 14:
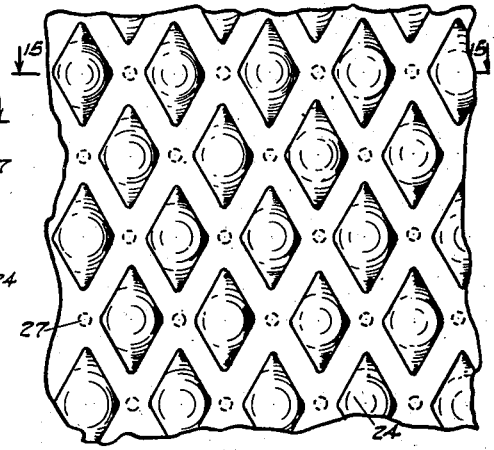

The further objects and advantages of the invention will be apparent from a consideration of the following description of embodiments of the invention taken with the accompanying drawings in which, Fig. 1 is a plan view of a vessel, parts of the vessel walls being broken away to show the interior thereof, lined in accordance with my invention, Fig. 2 is a fragmentary view of the vessel walls showing one form of lining, Fig. 3 is a sectional view taken on lines 3—3 of Fig. 2, Figs. 4, 6, 8, 10, 12, and 14 are views similar to Fig. 2, each showing a different form of lining, and, Figs. 5, 7, 9, 11, 13, and 15 are sectional views respectively taken on lines 5—5 of Fig. 4, lines 7—7 of Fig. 6, lines 9—9 of Fig. 8, lines 11—11 of Fig. 10, lines 13—13 of Fig. 12, and lines 15—15 of Fig. 14.

Referring to Fig. 1, a cylindrical vessel 20, having a shell portion 21 and convex ends or domes 22, is illustrated which may be used in the pressure cracking of petroleum oil. Vessel 20 is lined, preferably to cover the entire inner surface thereof, with a thin metallic lining 23. Lining 23 may be of any suitable material but is preferably of an alloy of high corrosion resisting properties such as chrome steel or chrome-nickel steel and the like. Vessel 20 may, as in the usual practice, be provided with manways, nozzles, pipe connections, etc., not shown.

While a cylindrical vessel 20 having convex ends is shown, it is to be clearly understood that the invention is not limited to a vessel shaped in this manner. The vessel 20 may be of any shape and may be positioned in any desired position without departing from the scope of the invention.

Vessel 20 may be fabricated in any desired manner. Thus in accordance with the more advanced practice, the section or sections that make up shell 21 may be formed as seamless cylinders by rolling pierced ingots or they may be formed by shaping flat plate to the cylindrical form and the longitudinal edges united by arc or gas welding. Ends or domes 22 may be shaped as in the usual manner. When the component parts of vessel 20 have been formed they are united into an integral whole by arc or gas welding their aligned abutting circumferential edges.

While vessel 20 may be lined after it has been completely fabricated, it is easier to line it before both of ends 22 are joined to shell 21. Thus it is more expeditious to line shell 21 and ends 22 to within a short distance of their ends and then unite one of ends 22 to shell 21. After this is done the lining of the closed end of vessel 20 may be completed. The other end 22 may then be united to shell 21 and the lining of vessel 20 completed.

Lining 23, as already stated, is generally made of a high corrosion resistant alloy such as chrome steel, chrome-nickel steel, and the like. Lining 23 is very thin as compared to the thickness of the walls of vessel 20 and while it may vary in thickness, depending on the conditions under which vessel 20 is to be used, it will seldom exceed $\frac{1}{16}$ths of an inch in thickness.

Lining 23, see Figures 2–15 in particular, in which the same numerals indicate corresponding parts, is so formed, as by stamping in suitable dies, that it has distributed over its entire area a plurality of convex, or concave areas 24 of regular geometrical shape. The convex or concave areas are arranged in regular geometric pattern. Thus in Figs. 1–9 areas 24 are in the form of spherical segments, in Figs. 10, 11, 14 and 15 they are in the form of curved surfaces having a parallelogram as a base, and in Figs. 12 and 13 they are in the form of curved surfaces having a triangle as a base. In Figs. 2, 4 and 8 areas 24 are arranged on what may be termed a nested diamond or an overlapping hexagonal pattern; in Figs. 6 and 10 areas 24 are arranged on a nested square pattern; in Fig. 12 areas 24 are arranged on a nested triangular pattern; and in Fig. 14 areas 24 are arranged on a nested diamond pattern. While a variety of forms and patterns of arrangement of areas 24 have been illustrated and described, the invention is not limited to the forms and patterns shown and described as it is obvious that there is a large number of other possible forms and patterns whose use is taught by this disclosure that can equally well be used.

While it is at present preferred to use the form and arrangement of Figs. 2 and 3, alloy sheets of the proper thickness required for lining 23, are stamped as stated to produce the desired form and arrangement of areas 24. Washers or buttons 25 are then fastened to the walls of vessel 20 as by tack-welding or similar expedient, so that there is one washer 25 for each area 24 and each washer 25 is positioned to concentrically underlie an area 24. This may be done by spotting the centers as by the use of a suitable template. Buttons 25 should be of such size that areas 24 will have all of the necessary freedom of movement towards the walls of vessel 20 but will support them against excessive movement that might in time cause rupture. After washers 25 are fastened, the sections of lining 23 are positioned to form a regular pattern throughout and are bonded to the walls of vessel 20 by means of spot welds 27 as they are positioned. While the cost is increased, plug welds may replace spot welds 27. In any event care should be taken that welds 27 be spaced accurately as otherwise the stress balance in use will be upset and the possibility of rupture of lining 23 at the welds may in some cases arise. The sections of lining 23 are joined into a unitary structure by means of welds 28 which of course should have corrosion resistant properties comparable to those of lining 23. Welds 28 may be deposited by electric arc welding or by gas welding.

While it is at present preferred to locate spot welds 27 between areas 24 as shown in Figs. 2–6 and 12–15, spot welds 27 may be located as shown in Figs. 8 and 9 to unite the centers of areas 24 to the centers of washers or buttons 25. This disposition of welds 27 may be used with any of the forms and arrangements of areas 24 shown.

Due to the comparative thinness of lining 23, and especially when vessel 20 is of large diameter, it will not in general be necessary to curve the sections of lining 23 used to cover shell 21 prior to the positioning of the sections. However when the diameter of vessel 20 is small, an initial curvature may be given to the sections of lining 23 during the stamping operation which curvature may be increased or decreased substantially, due to the thinness of the sections, as required during the positioning and welding operations. The lining sections for ends 22 may advantageously be formed as gores and thus reduce the pre-curving to a minimum.

Lining 23 may easily be repaired or replaced as any or all of the sections thereof may be easily removed by cutting through welds 28 and chipping welds 27. The sections necessary to replace the worn sections are applied in the same manner as the original sections.

Lining 23, having the characteristics of any of the forms shown and described, even though it is bonded by welds 27 to the walls of vessel 20, has in effect a limited movement in all directions relative to the walls of vessel 20. The effect of a limited movement in all directions is obtained by reason of areas 24 and the manner in which they are spaced over the surface of lining 23. Thus when expansion or a contraction of lining 23 relative to the walls of vessel 20 occurs, either by reason of difference in coefficient of expansion of the metal of lining 23 and the metal of the walls of vessel 20, or by reason of a temperature gradient, areas 24 will breathe, i. e., will expand or contract, without setting up any substantial stress in the rest of the lining. By reason of this, the portions of lining 23 not included in areas 24 will be subjected only to the stresses which they themselves generate. Therefore, the stress along any line at any time will be only a fraction of that along the same line in a similar lining that does not include areas 24. Since welds 27 are balanced as to the stresses to which they are subjected and the stresses are less than in the prior practice, the tendency to rupture welds 27 is also materially less than in the prior practice. Furthermore, since the portions of lining 23 between areas 24 approach the channel form, they are short stiff beams which can resist successfully greater stress without failure or distortion than the flat lining portions of the prior practice.

Furthermore, by reason of welds 27 and their arrangements as disclosed above, the heat transfer between lining 23 and the vessel walls 21 is uniform and takes place at a high rate. Thus extreme stresses in any part of lining 23 by reason of a large temperature gradient between it on the part of vessel walls 21 covered by it is avoided.

I claim:

1. A vessel comprising a shell of comparatively low corrosion resistant material, a thin interior lining for said shell of comparatively high corrosion resistant material, said lining having portions thereof approaching the segmental spherical form and extending away from the vessel walls to provide stress relieving areas, said stress relieving areas being systematically distributed over the entire surface of said lining on a recurring parallelogram pattern with said areas centered on the corners of the said pattern, and means symmetrically positioned relative to said areas bonding said lining to said shell.

2. A vessel comprising a shell of comparatively low corrosion resistant material, a thin interior lining for said shell of comparatively high corrosion resistant material, said lining having portions thereof approaching the segmental spherical form and extending away from the vessel walls to provide stress relieving areas, said stress relieving areas being systematically distributed over the entire surface of said lining on a recurring parallelogram pattern with said areas centered on the corners of the said pattern, spacing pads positioned on said shell concentrically with said areas, and means located between said areas bonding said lining to said shell.

3. A vessel comprising a shell of comparatively low corrosion resistant material, a thin interior lining for said shell of comparatively high corrosion resistant material, said lining having portions thereof approaching the segmental spherical form and extending away from said shell to provide stress relieving areas, said stress relieving areas being systematically distributed over the entire surface of said lining on a pattern made up of nested parallelograms, said areas being centered on the corners of said parallelograms, and welds symmetrically positioned relative to said areas on a regular pattern bonding said lining to said shell.

4. A vessel comprising a shell of comparatively low corrosion resistant material, a thin interior lining for said shell of comparatively high corrosion resistant material, said lining having portions thereof approaching the segmental spherical form extending away from said shell to provide stress relieving areas, said stress relieving areas being systematically distributed over the entire surface of said lining on a pattern made up of nested parallelograms, said areas being centered on the corners of said parallelograms, spacing pads positioned on said shell concentrically with said areas, and welds positioned on a hexagonal pattern between said areas bonding said lining to said shell.

5. A vessel comprising a shell of comparatively low corrosion resistant material, a thin interior lining for said shell of comparatively high corrosion resistant material made up of a plurality of sections welded together at their edges to form a unitary structure, said lining having portions thereof approaching the segmental spherical form extending away from said shell to provide stress relieving areas, said stress relieving areas being systematically distributed over the entire surface of said lining on a pattern made up of nested parallelograms, said areas being centered on the corners of said parallelograms, spacing pads positioned on said shell concentrically with said areas, and welds positioned on a hexagonal pattern between said areas bonding said lining to said shell.

HAROLD R. AUSTIN.